Patented Oct. 19, 1937

2,096,684

UNITED STATES PATENT OFFICE 2,096,684

PLASTIC COMPOSITION

Carl W. Neufeld, Cincinnati, Ohio, assignor to The Perfect Manufacturing Company, Cincinnati, Ohio, a corporation of Ohio No Drawing. Application November 9, 1935, Serial No. 49,114

14 Claims. (Cl. 106—38)

This invention relates to a plastic composition suitable for molding in general and adapted especially to the filling of crevices in wood, either for the purpose of repair or for the purpose of decorating the wood ornamentally.

More particularly the invention relates to a mass which is normally plastic before use, which is wood-like after use and which possesses the capacity of drying in air without shrinking, substantially, to provide a surface which is receptive to stains and coating finishes.

It has been common practice in the past to use putty-lead mixtures and the like, then paint over these, but the difficulty has been that such materials did not harden properly and that they were too different in nature, composition and hardness from wood to be satisfactory over any wide range of uses. Sawdust and shellac admixtures also have been used but such masses when dried are very brittle and too obviously unnatural to be adapted for any purposes other than repairs.

In recent years air drying plastic compositions have been proposed in which wood flour has been constituted into a dough-like, plastic mass by admixture with synthetic or natural resins, rendered appropriately viscid by organic solvents such as benzol, acetone, toluol and the like. Compositions of this type are subject to several serious disadvantages. In the first place, the resins which have been used are relatively expensive. Moreover, the resins have been of such characteristics that organic solvents have been required to effect their dissolution. Such solvents usually are highly volatile and almost always inflammable or explosive under certain conditions. Because of these conditions care has had to be taken to prevent ignition of the plastics during their use. Furthermore, it has been noticed by the users of such plastic compositions that precautionary steps must be taken to insure that the compositions be thoroughly sealed when not in immediate use lest the mass harden and has to be reconditioned or discarded.

It is therefore readily understood that such characteristics of the previously proposed plastics, namely inflammability, expense and tendency to harden when not in immediate use are particularly undesirable where the plastic is intended largely for home or domestic use.

It is the object of the present invention to provide an air hardening dough-like plastic composition which does not exhibit the disadvantages of the compositions heretofore discussed.

It is further the object of this invention to provide dough-like plastic masses which are inexpensive to prepare and inexpensive to use even in those instances where relatively large quantities are required.

Another object of the invention is to provide a composition which is air hardening but which is not flammable or dangerous to use in the presence of fire, before or after drying.

It is within the contemplation of the present invention that a composition of the type described preferably should be of such nature as to wet the walls of the aperture or crevices which it is intended to fill, in order that adhesion be augmented. Moreover it is within the contemplation of this invention that the plastic material herein disclosed has the property of securely holding metal objects, such as screws and the like, hence it is desirable that the composition exhibit the ability to wet and adhere to metal as well as wood surfaces. Because plastic masses of the type herein disclosed are subjected to a wide variety of requirements in use, it is very desirable that the hardness of the mass, after drying, and its flexibility, correspond substantially to the hardness or rigidity and the flexibility of wood, in order that the two substances may be tooled together, that is to say, sawed, planed or otherwise worked as a unitary body. For example, suppose it is desired to repair a configurated surface or curved edge marred by a large splinter hole, the plastic is applied with a knife to conform as nearly as possible to the configuration of the surrounding area, then allowed to dry, and finally the surface of the plastic, and that of the surrounding wood, if necessary, is reworked to finished form with a chisel, plane or similar sharp edged tool and sandpaper. A complete restoration of the continuity of the surface so treated, is thus readily accomplished.

With a view to the attainment of these objectives and the accomplishment of certain other objects, as will hereinafter appear, the present invention consists in a plastic composition in which a filler, such as wood flour or a fibrous filler and clay, is associated with a non-putrefactive binder containing casein, reduced to a viscid state, with a solvent consisting principally of water and ammonia.

In carrying out the invention, I prefer to use a filler which is cellulosic in nature or origin. I find that wood flour of medium fibre length, made either from hard or soft wood, is best suited to the purpose intended. However, other substances such as asbestos, leather, rockwool and the like, are, in many instances also useful as filler substances. Fibre of extremely short length, or very finely ground flour, is not desirable for the reason that the short fibres tend to induce cracking during the drying stage. Large fibre size (coarse ground flour) is undesirable because it leads to coarseness in the final product, limiting the capacity of the hardened mass to be finished to a fine state of smoothness. It is recommended for the purpose of the present invention that wood flour of approximately 40 to 70 mesh, in fineness, be used for general purposes. The mesh of the flour can be varied to suit special purposes if it is so desired. Wood flour and the other of the fibrous filler substances disclosed, being generally porous in nature, function to permit the escape of the liquids used to render the casein viscid, as the plastic is exposed to air. Clays, such as kaolin and inert non-porous materials such as powdered aluminum, zinc dust and the like may be used along with the porous materials in securing or controlling plastic or dough-like consistency. Powdered metals like those mentioned pigment the composition and their use is recommended when ornamental effects are intended.

As the primary ingredient for the binder adapted to associate collectively the particles of filler into an air hardening dough-like mass, powdered casein, reduced to a viscid state with water, is used. I find that casein possesses many desirable properties, when used for the purpose intended. It is low in price and its price is not subject to broad fluctuation in relation to economic conditions (in which respect it is totally unlike nitrocellulose and other of the synthetic resins heretofore used). It is a good adhesive. It dries to a rigid state of hardness, but does not cause the plastics in which it is used to become non-porous when dry. The color of casein is pale and neutral. Lastly, special, expensive or inflammable solvents are totally unnecessary in dissolving it to fluid state.

It must be mentioned, however, that an admixture of wood flour, water and casein tends to develop a mold-like growth during storage over a two or three day period. The development of such a mold growth is indicative of the occurrence of a chemical decomposition, analogous to putrefaction.

During the putrefaction period moreover, the admixture decreases progressively in viscosity, and loses its dough-like properties, apparently as if it were thinned out with water. Under such conditions the composition is substantially unfit for use. In view of the fact that it is usually desirable to store the composition herein disclosed in cans or other suitable containers, pending sale or use, it is highly desirable that this development of mold or putrefaction be inhibited. I have discovered that admixtures comprised of casein, wood and water are completely preserved and renderd non-putrefactive and non-molding by the use of small quantities of the alkali metal salts of parachlorometacresol, the alkali metal salts of orthophenylphenate or small quantities of hydroxy derivatives of diphenyl methane, that is, benzylated phenols. It may be stated that these preservative agents do not render the plastic compositions, in which they are used unpleasant in odor, or highly poisonous, nor do they affect the solubility of casein in water or tend to discolor the products which they preserve. In these latter respects, the preservatives which I have discovered, are distinguished from other agents, such as phenol, bichloride of mercury, beta naphthol and the like which have at various times been proposed for use with casein. In practicing the present invention, about .1% to about 1.25% of preservative agent, based on the weight of casein used, is recommended.

Wood flour—casein admixtures (with or without one of the preservative agents just mentioned) are, after hardening, susceptible to softening to a certain degree by water. Such a condition is, of course, to be avoided in plastics of the type to which the invention relates. The composition, in other words after hardening, should be substantially waterproof and the provision of this property must be accomplished without substantially disturbing the relationship of the other component of the mass. To accomplish these purposes I incorporate into the admixture an ingredient which possesses the capacity of rendering the mass insoluble or waterproof after the mass has been exposed to air and hardened, but which does not, by its incorporation, prevent or disturb the association of the other of the ingredients or detract from the plastic properties intended. The problem of obtaining such a result is complex, first, because of the nature of the composition which must be made waterproof after hardening and secondly, because the waterproofing ingredient must not act in its functional capacity until the plastic composition is exposed to air. I find that the problem is most easily solved by incorporating into the preserved plastic composition one or more of the materials of the group which include sodium bichromate, synthetic resins of the oxidizing glyptal type and the algin compounds, alginic acid, sodium alginate or alginates combined with inert mineral salts acting as fillers, fortified with a film forming substance such as trimethyl cellulose.

The algin compounds, alginic acid or sodium alginate, when fortified with a film forming substance such as trimethyl cellulose are very effective waterproofing agents, but the precise manner in which they function is not understood. Apparently these compounds, which are extremely complex chemically, lose the capacity to reabsorb water, once they have substantially dried, and, through such phenomena cause the plastic mass in which they are present, likewise to become waterproof when dry. Algin compounds when fortified with a film forming agent such as trimethyl cellulose, also possess the ability to act as a binding agent with respect to wood flour and the like, and are useful therefore as substitutes in whole or in part, for casein. Generally, they function best under slightly acid condition.

Sodium bichromate has the capacity to render a casein-water-wood flour admixture insoluble when the mixture in which the material is present is exposed to ultra violet light as during air hardening.

When it is desired to incorporate synthetic glyptal resins into the plastic compositions heretofore disclosed, it is best, first, to emulsify the resins, with water, then distribute them in emulsified state, throughout the mass to be treated. The emulsified resins appear to surround or intermix with the wood and casein (which forms a colloid solution with water) and, when the plastic mass is exposed to air the resins oxidize to form insoluble films or interspersed products which inhibit the softening of the mass by water.

The properties of casein vary in accordance with the nature of the process by which the casein is produced. In the formula disclosed below, I prefer to use casein obtained by the cold treatment of milk with hydrochloric acid. This particular product has a pH value of from about 4.3 to about 4.9. The product with the higher pH value is somewhat preferred to one of the lower value in that the viscosity of the final plastic made therewith and its ease of applicability in a given use are relatively superior.

Example 1

| | Parts by weight |
|---|---|
| Water | 353.0 |
| Casein | 83.3 |
| Wood flour | 90.8 |
| Borax | 4.8 |
| Ammonia 28° Bé | 10.5 |
| Hydroxy derivatives of diphenyl methane | .75 |

To waterproof this composition from about 2 to about 5% of sodium bichromate, from about 20 to 40% of glyptal resins in emulsified form or from about 20 to about 100% algin compounds heretofore mentioned may be used. The percentages are by weight.

In place of borax, boric acid may be used in substantially the same quantity. Likewise, in place of the preservative agent disclosed, about .3 part by weight of alkali metal salts of parachlorometacresol may be used as a substitute.

Example 2

| | Parts by weight |
|---|---|
| Wood fibre | 50 |
| Kaolin | 100 |
| Water | 100 |
| Algin binder including sodium alginate, alginic acid, trimethyl cellulose, ammoniated water and mineral salt filler | 150 |
| Alkali salts of parachlorometacresol | .2 |

It will be noticed that the above formula represents a plastic composition in which the binder comprises the algin compound as distinguished from casein.

I have determined that a small quantity of formaldehyde is useful in augmenting the waterproof qualities of dry plastic when casein is used as the primary binder ingredient. For this purpose ½ of a 37% formaldehyde solution, added to the water in which the casein is to be dissolved, is usually sufficient.

In preparing plastic compositions from the ingredients disclosed, it is recommended first, that a solution of casein in water be provided, then the wood flour and other ingredients be incorporated into such solution. Next, the mixture is reduced to a homogeneous and uniform state of consistency and the mass placed into cans or other suitable containers, in which it may, if desired, be stored for long periods of time without exhibiting any tendency to decompose or otherwise change in state. If a can of the plastic composition herein disclosed, inadvertently is left unsealed for any substantial period of time, some hardening of the plastic occurs. In such instances, the composition is reconstituted to the desired consistency by the addition of a small quantity of water, treated with a small quantity of ordinary household ammonia.

In using the plastics of the invention in filling crevices or apertures in a piece of wood, it is recommended that the wood be planed or scraped to provide a completely level surface. Next, the material is applied just as if it were ordinary putty and complete drying occurs during an overnight period. The piece of wood with the fill may then be finished by sanding, staining, painting or lacquering, as a unitary homogeneous structure. Where oil or spirit stains are used, it will be noticed that the color of the fill is substantially the same as the color of the wood surrounding the fill.

Having described my invention, I claim:

1. A plastic, dough-like, adhesive composition, comprising a filler of wood flour, and a clay, and a binder for said filler, comprising casein reduced with water and rendered non-putrefactive with a preservative agent selected from the group comprising hydroxy derivatives of diphenyl methane, alkali metal salts of parachlorometacresol, and the sodium salts of orthophenylphenate.

2. A plastic, dough-like, adhesive composition, comprising wood flour, casein and water, said admixture rendered non-putrefactive by a small quantity of an alkali metal salt of parachlorometacresol.

3. A composition of the type described, comprising wood flour, water, casein, borax and ammonia, said composition rendered non-putrefactive by a preservative agent selected from the group exemplified by alkali metal salts of parachlorometacresol, alkali metal salts of orthophenylphenate and hydroxy derivatives of diphenyl methane and rendered moisture resistant upon hardening by a waterproofing agent, such as sodium bichromate adapted to become waterproof upon exposure to ultra violet light.

4. A plastic dough-like composition comprising water about 353 parts, casein about 83 parts, wood flour about 90 parts, borax about 5 parts, ammonia about 10 parts and from about .1 to about 1.25% of a preservative agent of the type of hydroxy derivatives of diphenyl methane, said percentage based on the weight of said casein.

5. A plastic, dough-like composition, the constituting components of which include water, casein, wood flour, borax, ammonia and a preservative agent selected from the group comprising hydroxy derivatives of diphenyl methane, alkali salts of parachlorometacresol and sodium salts of orthophenylphenate.

6. In a plastic composition of the type described, a fibrous filler of the type exemplified by wood flour, ground asbestos fibre and rockwool, a binder of casein and water, said water rendered alkaline by ammonia, said binder and said wood rendered non-putrefactive by a preservative agent selected from the group comprising alkali metal salts of parachlorometacresol, alkali metal salts of orthophenylphenate and hydroxy derivatives of diphenyl methane.

7. A plastic, dough-like, adhesive composition, comprising a filler of wood flour, and a binder for said filler, comprising casein reduced with water and ammonia and rendered non-putrefactive with a preservative agent selected from the group comprising hydroxy derivatives of diphenyl methane, alkali metal salts of parachlorometacresol, and the alkali metal salts of orthophenylphenate.

8. A plastic, dough-like adhesive composition, comprising wood flour, casein and water, said admixture rendered non-putrefactive by about .1% to about 1.25% by weight of the casein of an alkali metal salt of parachlorometacresol.

9. A plastic, dough-like, adhesive composition, comprising a filler of wood flour, a clay, and a binder for said filler, comprising casein reduced with water and rendered non-putrefactive with approximately .1% to approximately 1.25%, by weight, of the casein, of a preservative agent selected from the group comprising hydroxy derivatives of diphenyl methane, alkali metal salts of parachlorometacresol, and the sodium salts of orthophenylphenate.

10. A plastic, dough-like composition, the constituting components of which include water, casein, wood flour, borax, ammonia and approximately .1% to 1.25% by weight, of the casein, of a preservative agent selected from the group comprising hydroxy derivatives of diphenyl methane, alkali salts of parachlorometacresol and sodium salts of orthophenylphenate.

11. A plastic putty-like composition adapted to harden upon exposure to air, in which casein, rendered viscid with water, as the binder, is rendered non-putrefactive by means of an agent selected from the group comprising alkali metal salts of parachlorometacresol, hydroxy derivatives of diphenyl methane and sodium salts of orthophenylphenate.

12. A method of inhibiting the putrefaction of a composition in which casein, wood flour, and water are present, which method comprises treating said composition with a small quantity of an agent selected from the group comprising alkali metal salt of parachlorometacresol, sodium salt of orthophenylphenate and hydroxy derivatives of diphenyl methane.

13. The method of inhibiting the putrefaction, during storage, of a composition comprised of casein, wood flour, and water, which method comprises incorporating into said composition approximately .1% to approximately 1.25% of a preservative agent comprising alkali metal salts of parachlorometacresol, alkali metal salts of orthophenylphenate and hydroxy derivatives of diphenyl methane.

14. In the method of manufacturing a plastic dough-like composition adapted to harden upon exposure to air, the step which comprises admixing casein with wood flour and water, and the step which comprises treating said admixture with a small quantity of agent of alkali metal salt of parachlorometacresol, whereby said admixture is rendered substantially non-putrefactive.

CARL W. NEUFELD.